(12) United States Patent
Hirabayashi et al.

(10) Patent No.: US 8,147,149 B2
(45) Date of Patent: Apr. 3, 2012

(54) BARRIER UNIT

(75) Inventors: Koichiro Hirabayashi, Osaka (JP); Akio Konishi, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/866,266

(22) PCT Filed: Feb. 9, 2009

(86) PCT No.: PCT/JP2009/000512
§ 371 (c)(1),
(2), (4) Date: Aug. 5, 2010

(87) PCT Pub. No.: WO2009/098907
PCT Pub. Date: Aug. 13, 2009

(65) Prior Publication Data
US 2010/0322616 A1    Dec. 23, 2010

(30) Foreign Application Priority Data

Feb. 7, 2008    (JP) .................................. 2008-027450

(51) Int. Cl.
G03B 17/00    (2006.01)
G03B 11/04    (2006.01)
(52) U.S. Cl. ........................................ 396/448; 359/511
(58) Field of Classification Search .................. 396/448; 359/511
See application file for complete search history.

(56) References Cited

U.S. PATENT DOCUMENTS

| 5,862,426 A | 1/1999 | Ichino et al. |
| 2004/0165880 A1 | 8/2004 | Ichino |
| 2006/0098975 A1 | 5/2006 | Kobayashi |
| 2008/0025719 A1 | 1/2008 | Uehara |

FOREIGN PATENT DOCUMENTS

| JP | 09-211536 | 8/1997 |
| JP | 10-068984 | 3/1998 |
| JP | 10-319475 | 12/1998 |
| JP | 2004-258120 | 9/2004 |
| JP | 2005-070594 | 3/2005 |
| JP | 2005-308810 | 11/2005 |
| JP | 2006-018144 | 1/2006 |
| JP | 2008-033152 | 2/2008 |

OTHER PUBLICATIONS

International Search Report for corresponding International Application No. PCT/JP2009/000512 mailed Mar. 17, 2009.

*Primary Examiner* — Rochelle-Ann J Blackman
(74) *Attorney, Agent, or Firm* — Renner, Otto, Boisselle & Sklar, LLP

(57) ABSTRACT

The present invention provides a barrier unit, of which the blades can be opened fully.
The barrier unit is designed to be attached to a camera in order to protect the lens of the camera and is ready to open or close as needed. The barrier unit includes: a base with a cylindrical portion; a first ring, which is arranged so as to rotate around the cylindrical portion; and first and second blades, which are interlocked with the first ring and which are gradually opened and closed as the first ring rotates. When one of the first and second blades is fully opened, the first ring is further movable to turn the other blade in a closing direction.

8 Claims, 9 Drawing Sheets

BARRIER UNIT

TECHNICAL FIELD

The present invention relates to a barrier unit to be opened and closed in front of the lens of a still camera or a video movie camera to protect that lens.

BACKGROUND ART

Recently, as the sizes and thicknesses of still cameras and video movie cameras have been further reduced, the size and thickness of a barrier unit, which is used to protect their lens, have also been reduced year by year.

Hereinafter, a conventional barrier unit will be described as an example with reference to FIGS. 6 through 9.

FIGS. 6 and 7 are exploded perspective views respectively illustrating the upside and downside of respective members of a conventional barrier unit.

The conventional barrier unit includes a cap 1, first and second blades 2 and 3, a base 4, first and second rings 5 and 6, and first and second springs 7 and 8.

The first and second blades 2 and 3 are pivoted to the base 4 by fitting pivots 9 and 10 on the base 4 into pivot holes 15 and 16, respectively. By getting hooks 11, which are elastic members that form integral parts of the cap 1, engaged with hook stoppers 12 of the base 4, the cap 1 is fitted to the base 4 so as to sandwich the first and second blades 2 and 3 between them and to leave a predetermined clearance that is wide enough to let those barrier blades 2 and 3 rotate freely there.

The cap 1 has a window 13. The first and second rings 5 and 6 are fitted rotatably to the cylindrical portion 14 of the base 4. The cam pins 19 and 20 of the first ring 5 are engaged into elongate holes 17 and 18 of the first and second blades to turn the blades.

The first spring 7 is extended between respective spring hooks 21 and 22 of the first and second rings 5 and 6. Likewise, the second spring 8 is extended between respective spring hooks 23 and 24 of the second ring 6 and the base 4.

The second ring 6 has a ring projection 25, which is fitted into a notched portion 26 of the first ring 5, thereby assembling the first and second rings 5 and 6 together.

The base 4 also has a window 27.

The second ring 6 has a cam portion 28, which is biased and driven by driving means (not shown) to the direction in which the first and second blades 2 and 3 close, as indicated by the arrow B.

The first and second rings 5 and 6 are combined together with the first spring 7. As the second ring 6 is driven in the closing direction (as indicated by the arrow B) by the cam portion 28, the first and second blades 2 and 3 are closed. And even if the second ring 6 can afford to further turn in the same closing direction after that, the first spring 7 expands to prevent the second ring 6 from going too far with respect to the first ring 5.

FIG. 8 is a schematic representation illustrating the opened position of the first and second blades 2 and 3 in the conventional barrier unit. On the other hand, FIG. 9 is a schematic representation illustrating how the first and second blades 2 and 3 in the opened position will backlash. FIGS. 8 and 9 illustrate the arrangement of the respective members in the opened position as viewed in the direction indicated by the arrow A in FIGS. 6 and 7.

As shown in FIG. 8, the second ring 6 is biased by the second spring 8 to the opening direction as indicated by the arrow C. As a result, the ring projection 25 of the second ring 6 presses the notch 26 of the first ring 5, thereby driving the first ring 5 in the direction indicated by the arrow C. In the meantime, the cam pin 19 also presses the elongate hole 17 and biases the first blade 2 to the opening direction. The first blade 2 is pressed against and brought into contact with the stopper 29 and stops turning there. The stopper 29 is arranged on the base 4. When the first blade 2 stops this way, the first ring 5 stops turning and the position of the other cam pin 20 is determined.

On the other hand, as the first ring 5 is driven in the direction indicated by the arrow C, the cam pin 20 also presses the elongate hole 18 and biases the second barrier blade 3 to the opening direction. When the position of the cam pin 20 is determined, that of the second blade 3 is also determined accordingly. Another stopper 30 is provided for the second blade 3 and is also arranged on the base 4.

Another exemplary conventional barrier unit is disclosed in Patent Document No. 1, for example.

Patent Document No. 1: Japanese Patent Application Laid-Open Publication No. 2004-258120

DISCLOSURE OF INVENTION

Problems to be Solved by the Invention

According to the conventional arrangement, however, even if a blade is supposedly driven to a "closed" position, the blade could still protrude into the window 13. That is to say, so-called "insufficient blade closure" sometimes occurs.

Generally speaking, to let various machine parts move smoothly in a mechanism such as a barrier unit, some clearance needs to be left between those parts that interlock or fit with each other. For example, clearance should be left between the first elongate hole 17 and the cam pin 19 and between the second elongate hole 18 and the cam pin 20. In other words, those parts cannot move unless there is any clearance between them. However, that clearance will cause backlash between those parts.

The insufficient blade closure also arises due to the backlash between those parts as shown in FIG. 9. As shown in FIG. 9, if the first blade 2 is biased against the stopper 29 as the cam pin 19 presses the first elongate hole 17, the rest position (i.e., the fully opened position) of the first blade 2 is determined by the stopper 29. When the position of the first blade 2 is determined, those of the first ring 5 and the cam pin 20 are also determined. In this case, the second blade 3 will backlash due to the clearance left between the cam pin 20 and the second elongate hole 18. As a result, the second blade 3 is not biased against (i.e., not brought into contact with) the stopper 30 but will sometimes backlash in the closing direction due to its own weight and depending on the varying position of the barrier unit itself. Consequently, the blade protrudes into the window 13.

The insufficient blade closure may also arise even if the first blade 2 is not biased against the stopper and even if the second blade 3 does not backlash. For instance, according to the precision of those machine parts, if the second blade 3 is biased against the stopper 30, the first ring 5 may stop turning before the first blade 2 is fully opened, thus possibly making the first blade 2 backlash in some cases.

As described above, no matter how much the precision of those machine parts is increased, when one of the two blades is fully opened, the other blade will almost always backlash. That is to say, the mechanism of such a conventional unit prevents it from opening both of the two blades fully depending on the varying position of the device itself or due to vibrations produced during its use, which is an inherent problem with the conventional barrier unit.

On top of that, unless both of the blades are opened fully, the appearance of the barrier unit is also ruined. That is why to improve the appearance as much as possible, the backlash should be minimized (e.g., to the range of 0.02 mm to 0.05 mm) during the design process and those machine parts have to be manufactured and assembled together with very high precision.

It is therefore an object of the present invention to provide a barrier unit, of which the blades can be opened fully.

Means for Solving the Problems

A barrier unit according to the present invention is designed to be attached to a camera in order to protect the lens of the camera and is ready to open or close as needed. The barrier unit includes: a base with a cylindrical portion; a first ring, which is arranged so as to rotate around the cylindrical portion; and first and second blades, which are interlocked with the first ring and which are gradually opened and closed as the first ring rotates. When one of the first and second blades is fully opened, the first ring is further movable to turn the other blade in an opening direction.

The barrier unit may further include a second ring, which is arranged so as to rotate around the cylindrical portion. An elastic member may be arranged between the first and second rings in order to bias the first ring to a direction in which the first and second blades are closed. A ring-to-ring interlocking portion may be further arranged between the first and second rings. And the interlocking portion may be located near the elastic member on the first ring.

When one of the first and second blades is fully opened, the first ring may further move to open the other blade fully.

Another barrier unit according to the present invention is also designed to be attached to a camera in order to protect the lens of the camera and is ready to open or close as needed. The barrier unit includes: a base with a cylindrical portion; first and second blades, which are arranged so as to turn with respect to the base; and first and second rings, which are arranged so as to rotate around the cylindrical portion. The first ring has first and second fitting portions to fit into, and drive, the first and second blades, respectively. If an opening direction is the direction of rotation of the first ring that causes the first and second blades to open via the first and second fitting portions and if a closing direction is the opposite direction of the rotation of the first ring that causes the first and second blades to close via the first and second fitting portions, a first elastic member is extended between the first and second rings so as to bias the first ring to the closing direction; a ring-to-ring interlocking portion is arranged between the first and second rings; and a second elastic member is extended between the base and the second ring so as to bias the first ring to the closing direction via the ring-to-ring interlocking portion. As the second ring is driven, the first ring rotates in the closing direction via the ring-to-ring interlocking portion, thereby closing the first and second blades. Unless the second ring is driven, the first and second blades are kept opened by the second elastic member. Clearance is left between the first ring and the cylindrical portion of the base perpendicularly to the direction of rotation of the first ring. And the ring-to-ring interlocking portion is arranged at only one position near the first elastic member on the first ring.

The first and second fitting portions may be arranged at two opposite positions so that an angle of approximately 180 degrees is formed between the first and second fitting portions with respect to the center of rotation of the first and second rings on the base. The ring-to-ring interlocking portion may be arranged in the vicinity of a midpoint between the first and second fitting portions on the first ring.

The second elastic member may be arranged at a position on the second ring so as to face the ring-to-ring interlocking portion at the other end and to define an angle of approximately 180 degrees between the second elastic member and the ring-to-ring interlocking portion.

A camera according to the present invention includes a barrier unit according to any of the preferred embodiments of the present invention described above.

Effects of the Invention

In the barrier unit of the present invention, when one of two blades is opened, a ring that is interlocked with the blade is further rotatable around their interlocking point. As a result, both of the two blades are biased securely to their respective expected positions where the blades contact with their stoppers. Consequently, the insufficient blade opening can be avoided even if the position of the device with the barrier unit varies or if significant vibrations are produced during the use.

DESCRIPTION OF REFERENCE NUMERALS

Figure 1:
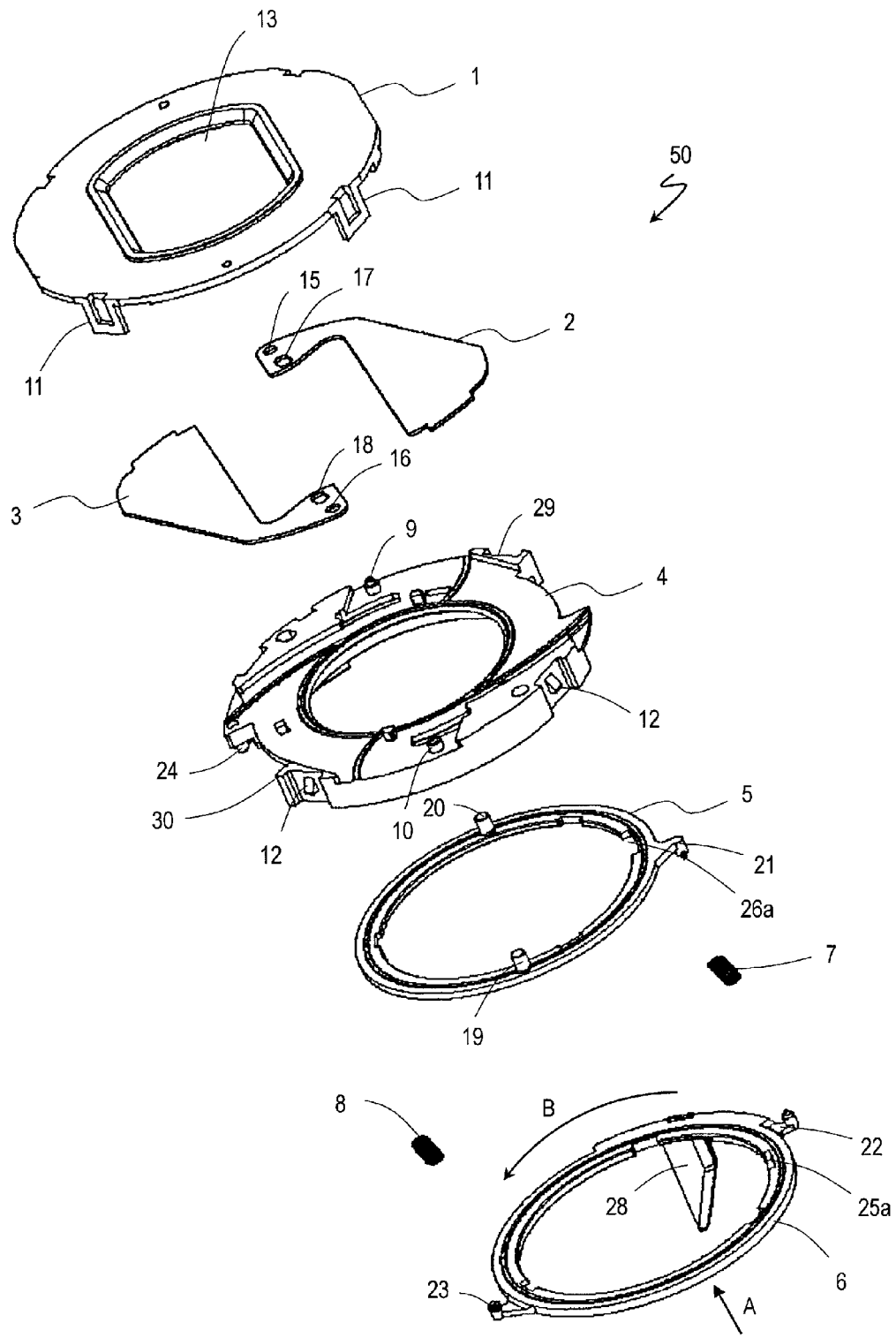
FIG. 1 is an exploded perspective view illustrating the upside of respective members of a barrier unit 50.

1 cap
2 first blade
3 second blade
4 base
5 first ring
6 second ring
7 first spring
8 second spring
19, 20 cam pin
17, 18 elongate hole
21, 22, 23, 24 spring hook
25*a* ring projection
26*b* notched portion

BEST MODE FOR CARRYING OUT THE INVENTION

Hereinafter, a preferred embodiment of a barrier unit according to the present invention will be described with reference to the accompanying drawings.

Figure 2:
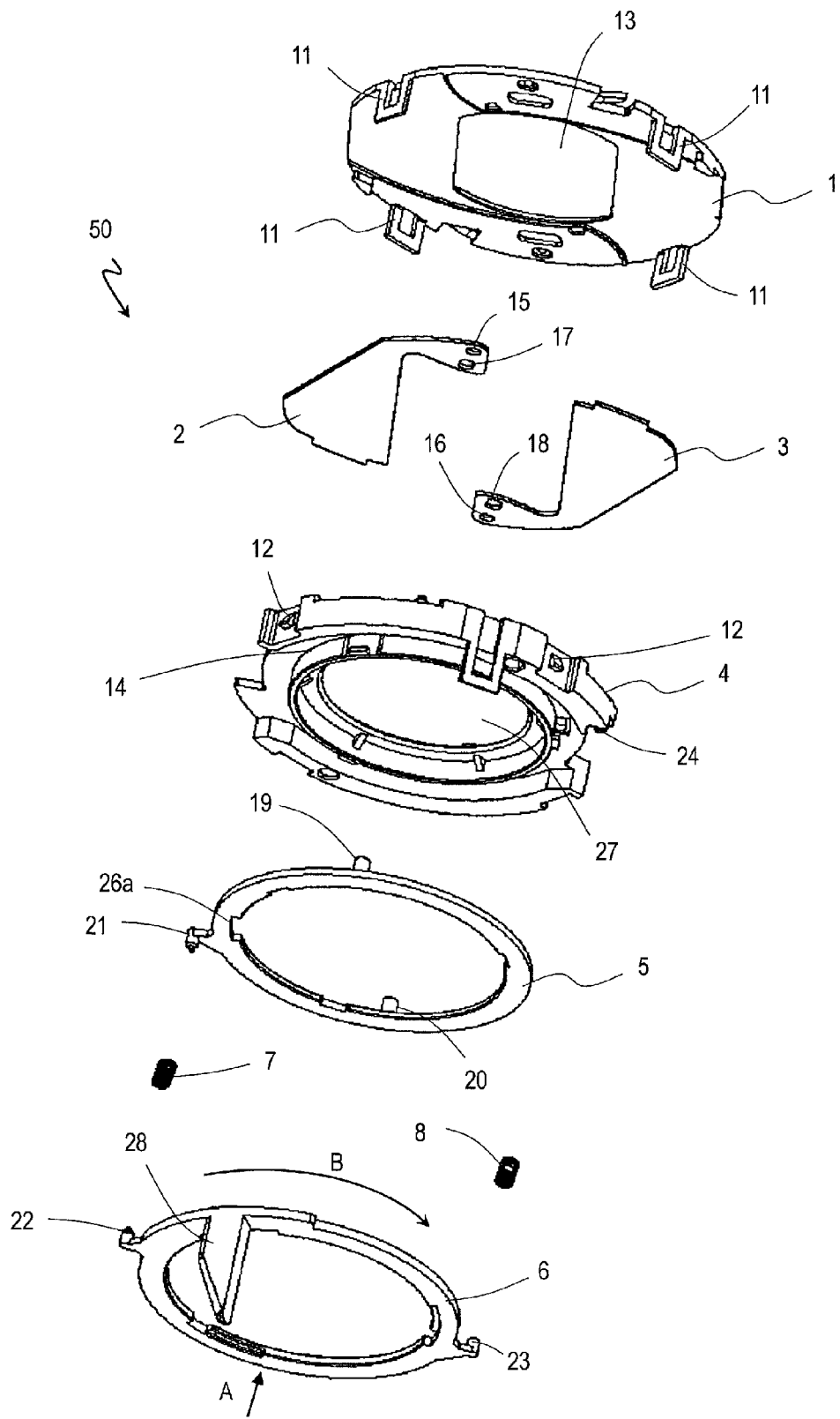
FIG. 2 is an exploded perspective view illustrating the downside of those members of the barrier unit 50.

FIGS. 1 and 2 are exploded perspective views respectively illustrating the upside and downside of respective members of a barrier unit 50 according to the present invention.

As shown in FIGS. 1 and 2, the barrier unit 50 includes a cap 1, first and second blades 2 and 3, a base 4, first and second rings 5 and 6, and first and second springs 7 and 8.

The first and second blades 2 and 3 are provided to protect the lens of a camera when the barrier unit 50 is attached to the camera. When the user performs shooting using the camera, the first and second blades 2 and 3 are opened. Otherwise (e.g., when the camera is turned OFF), the first and second blades 2 and 3 are closed.

The first and second blades 2 and 3 are pivoted to the base 4 by fitting pivots 9 and 10 on the base 4 into pivot holes 15 and 16, respectively. By getting hooks 11, which are elastic members that form integral parts of the cap 1, engaged with hook stoppers 12 of the base 4, the cap 1 is fitted to the base 4 so as to sandwich the first and second blades 2 and 3 between them and to leave a predetermined clearance that is wide enough to let those blades 2 and 3 turn freely there.

The cap 1 is provided to protect the first and second blades 2 and 3 in opened position.

The cap 1 has a window 13. The first and second rings 5 and 6 are fitted rotatably to the cylindrical portion 14 of the base 4. The cam pins 19 and 20 of the first ring 5 are engaged into elongate holes 17 and 18 of the first and second blades to turn the blades.

The first spring 7 is extended between respective spring hooks 21 and 22 of the first and second rings 5 and 6. Likewise, the second spring 8 is extended between respective spring hooks 23 and 24 of the second ring 6 and the base 4.

The second ring 6 has a ring projection 25a, which is fitted into a notched portion 26a of the first ring 5, thereby assembling the first and second rings 5 and 6 together.

The base 4 also has a window 27 and is arranged so as to face the cap 1. In this case, these two windows 27 and 13 are also arranged to face each other so that a subject image passes through the windows 27 and 13 of the base 4 and the cap 1. As a result, an optical path that guides the subject image to a lens is formed.

The second ring 6 has a cam portion 28, which is biased by driving means (not shown) to the direction in which the first and second blades 2 and 3 close, as indicated by the arrow B. In this way, the second ring 6 is driven.

The first and second rings 5 and 6 are combined together with the first spring 7. As the second ring 6 is driven in the closing direction (as indicated by the arrow B) by the cam portion 28, the first and second blades 2 and 3 are closed. And even if the second ring 6 can afford to further turn in the same closing direction after that, the first spring 7 expands to prevent the second ring 6 from going too far with respect to the first ring 5.

On the other hand, the second spring 8 biases the second ring 6 to the opening direction, thereby driving the first ring 5 as the ring projection 25a and the notched portion 26 are engaged with each other. The cam pin 19 is fitted into the elongate hole 17 of the first blade 2 to bias the first blade 2 to the opening direction. And the first blade 2 eventually contacts with a stopper 29 and stops turning there.

Figure 3:
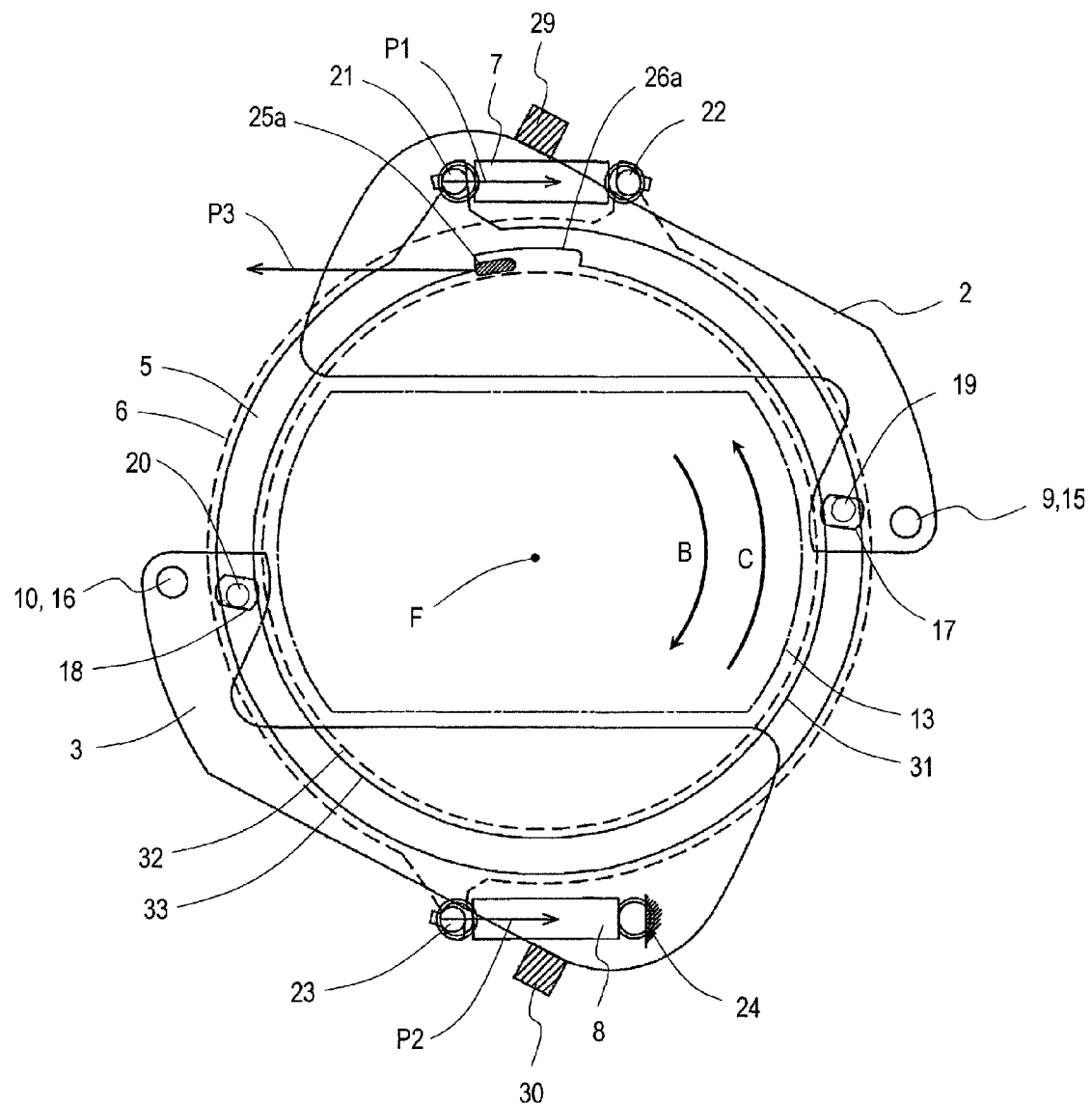
FIG. 3 is a schematic representation illustrating the first and second blades 2 and 3 in the opened position in the barrier unit 50.

FIG. 3 is a schematic representation illustrating the first and second blades 2 and 3 in the opened position in the barrier unit 50 of this preferred embodiment. Specifically, FIG. 3 illustrates where the respective members are located, when viewed in the direction indicated by the arrow A in FIGS. 1 and 2, while the blades are opened.

As already described with reference to FIG. 2, according to this preferred embodiment, the first and second rings 5 and 6 are fitted rotatably to the cylindrical portion 14 of the base. Also, as shown in FIG. 3, the inside diameter 33 of the first ring 5 is defined to be greater than that (identified by the reference numeral 32) of the second ring 6. That is why there is a clearance 31 between the first ring 5 and the cylindrical portion 14 of the base 4 (see FIG. 2) perpendicularly to the rotating direction of the first ring 5.

Hereinafter, the arrangement of this preferred embodiment shown in FIG. 3 will be compared to the conventional one shown in FIG. 8.

Figure 8:
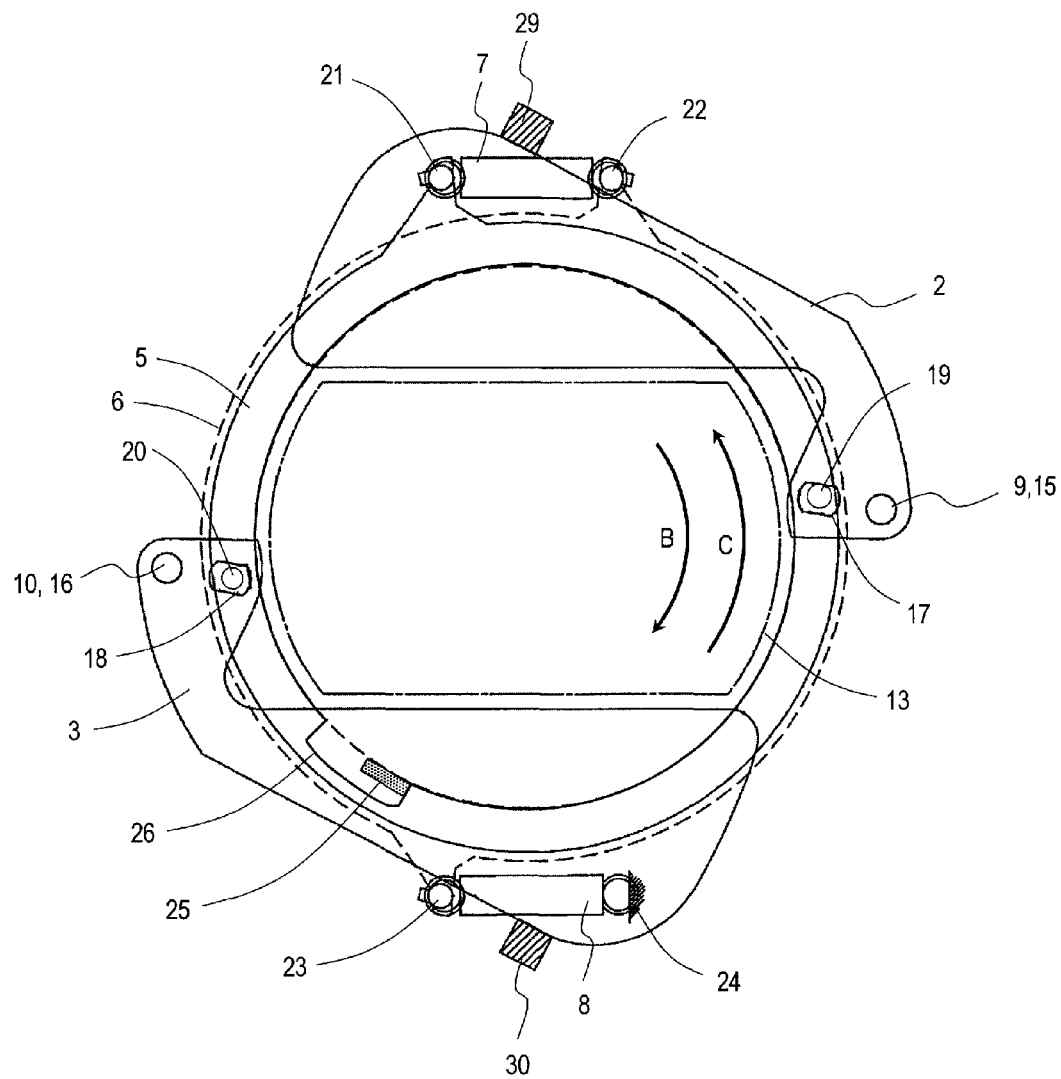
FIG. 8 is a schematic representation illustrating the first and second blades 2 and 3 in the opened position in the conventional barrier unit.
Figure 9:
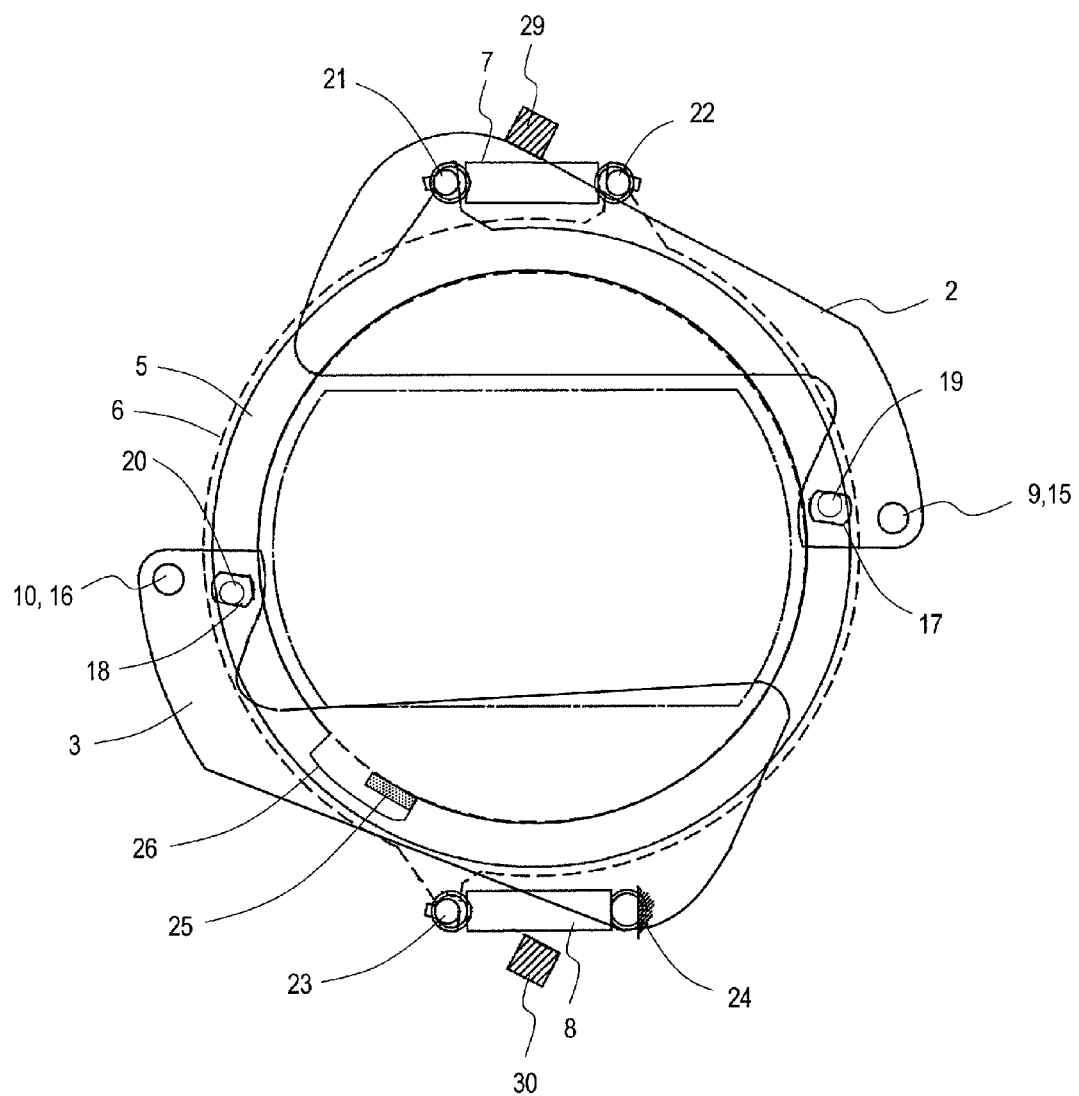
FIG. 9 is a schematic representation illustrating how the first and second blades 2 and 3 in the opened position will backlash.

In the conventional arrangement shown in FIG. 8, the respective inside diameters of the first and second rings 5 and 6 substantially agree with each other. This can be seen easily because in the vicinity of the ring projection 25 shown in FIG. 8, the dashed circle indicating the inside diameter of the second ring 6 substantially agrees with the solid circle indicating that of the first ring 5.

On the other hand, in the arrangement of this preferred embodiment shown in FIG. 3, the inside diameter 33 of the first ring 5 is defined to be greater than that (32) of the second ring 6 and these two diameters disagree with each other as described above. This is because there is a wider clearance 31 between the first ring 5 and the cylindrical portion 14 (see FIG. 2) of the base 4 than between the second ring 6 and the cylindrical portion 14 of the base 4.

Also, in the arrangement of this preferred embodiment shown in FIG. 3, the ring projection 25a and the notched portion 26a, which function as interlocking portions for the first and second rings 5 and 6, are arranged in the vicinity of the spring hook 21 on the first ring 5 to which the first and second blades are fitted. On the other hand, in the conventional arrangement shown in FIG. 8, the first and second rings 5 and 6 are not interlocked with each other in the vicinity of the spring hook 21 on the first ring 5 to which the first and second blades are fitted. That is why the conventional arrangement does not include members corresponding to the ring projection 25 and the notched portion 26 of this preferred embodiment.

According to this preferred embodiment, when one of the first and second blades 2 and 3 is biased to its rest position where the blade contacts with the stopper (i.e., when the one blade is fully opened), the first ring is further rotatable around the point at which the ring and the blade are fitted to each other. This is because as the clearance 31 is left, the first ring can further go a distance corresponding to the clearance 31.

Furthermore, since the ring projection 25a and the notched portion 26a, which function as interlocking portions for the first and second rings, are arranged in the vicinity of the spring hook on the first ring 5 to which the first and second blades are fitted, the other blade can further move in the opening direction.

When one of the two blades is biased to its rest position where the blade contacts with its associated stopper, the magnitude of this clearance 31 needs to be equal to or greater than the distance that is designed to be left between the other blade and its stopper. As a result, both of the first and second blades 2 and 3 can be securely biased to their rest positions where they contact with their stopper, and can be fully opened irrespective of the varying position of the device itself or vibrations produced during the use.

Hereinafter, the arrangement of this preferred embodiment shown in FIG. 3 will be described in further detail.

As shown at the top of FIG. 3, the notched portion 26a of the first ring 5 and the ring projection 25a of the second ring 6 are arranged in the vicinity of the spring hook on the first ring 5 to which the first spring 7 is attached.

Next, suppose a line that runs horizontally from right to left over the base 4 is drawn as the diameter of the circle, of which the center passes the center of rotation F of the first and second rings 5 and 6 on the base 4. On that line, arranged are the cam pin 19 of the first ring 5 that is fitted into the elongate hole 17 of the first blade 2 and the cam pin 20 of the first ring 5 that is fitted into the elongate hole 18 of the second blade 3. However, these cam pins do not always have to be arranged on the same line. Rather, these elongate holes 17 and 18 and the cam pins 19 and 20 just need to be arranged at two opposite positions so as to define an angle of approximately 180 degrees between them with respect to the center of rotation F.

And around the midpoint (i.e., at the top of FIG. 3) between the cam pins 19 and 20 on the first ring 5, arranged are the notched portion 26a of the first ring 5 and the ring projection 25a of the second ring 6. Also, the spring hook 23 on the second ring 6, to which the second spring 8 is attached, is arranged substantially opposite to the notched portion 26a and the ring projection 25a so as to define an angle of approximately 180 degrees between them with respect to the center of rotation F.

Hereinafter, it will be described with reference to FIGS. 4 and 5 what forces are applied to the opened blades in the barrier unit 50 of this preferred embodiment and what moments those forces produce. When the moment of some force is calculated, the position of its fulcrum needs to be determined. And the position of the fulcrum changes depending on which of the first and second blades 2 and 3 is pressed against its stopper 29 or 30 earlier than the other. In this description, FIGS. 4 and 5 are used to illustrate what moments will be produced by forces that have different fulcrums.

Figure 4:
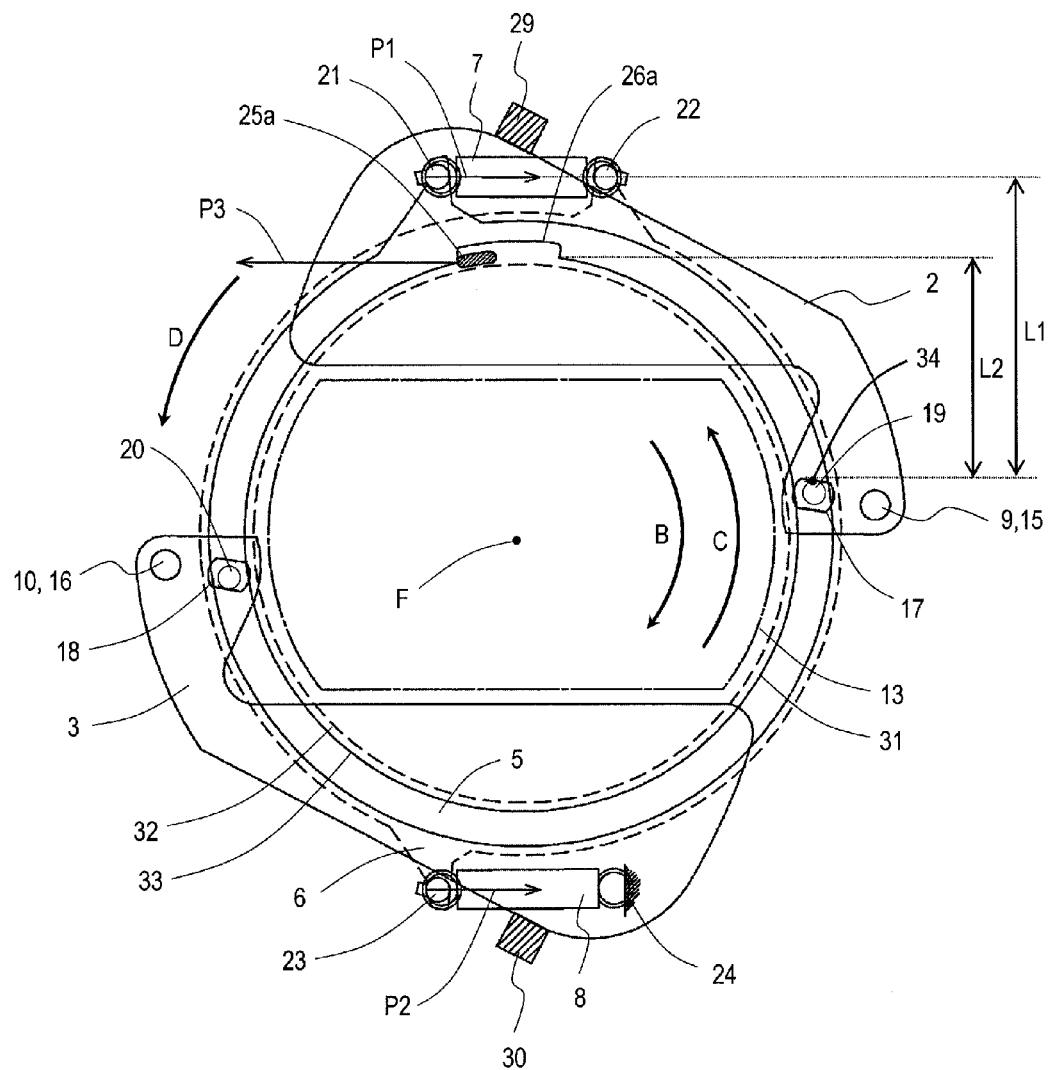
FIG. 4 is a schematic representation illustrating what forces are applied to the opened blades in the barrier unit 50.
Figure 5:
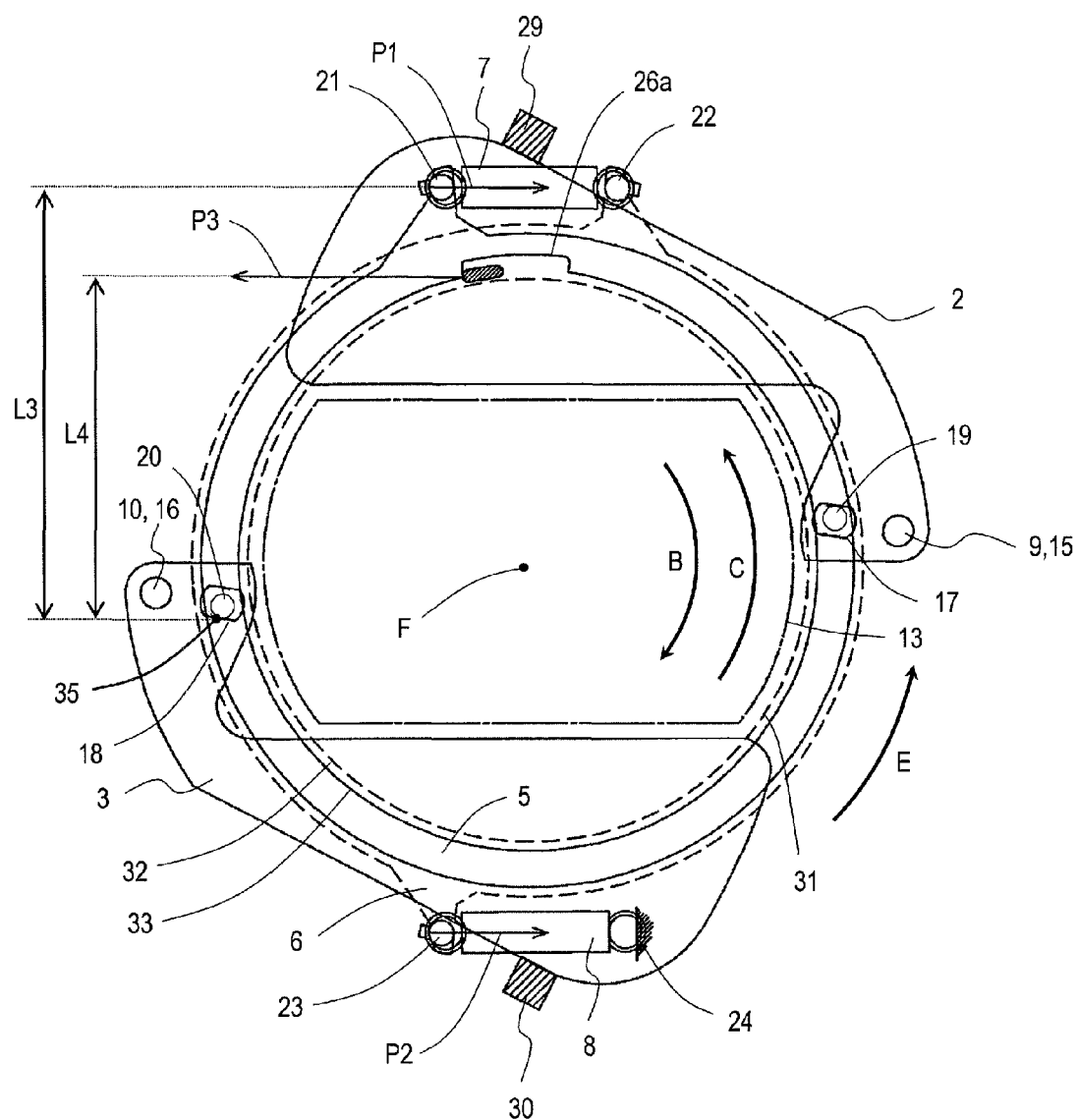
FIG. 5 is a schematic representation illustrating what forces are applied to the opened blades in the barrier unit 50.
Figure 6:
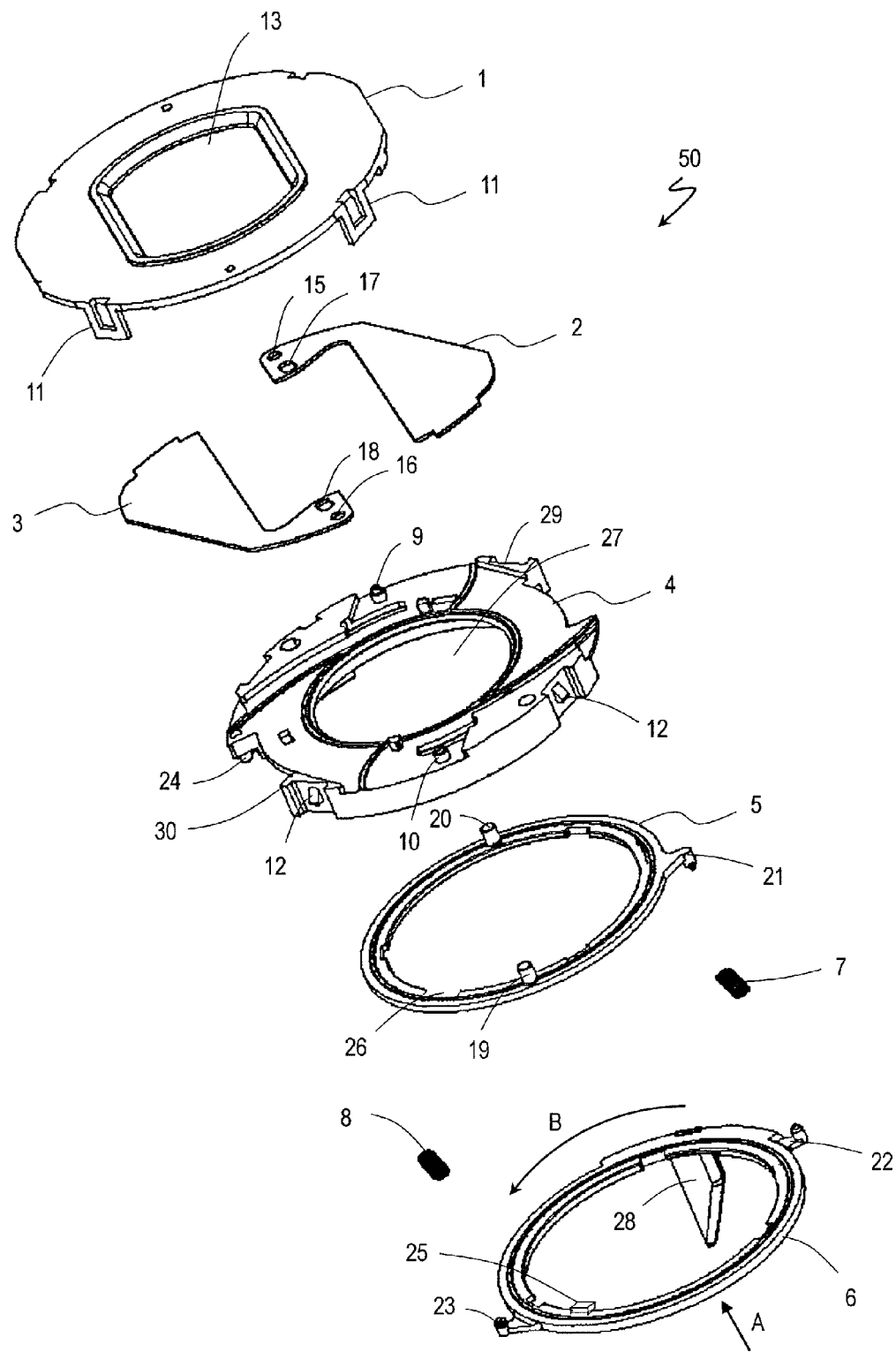
FIG. 6 is an exploded perspective view illustrating the upside of respective members of a conventional barrier unit.
Figure 7:
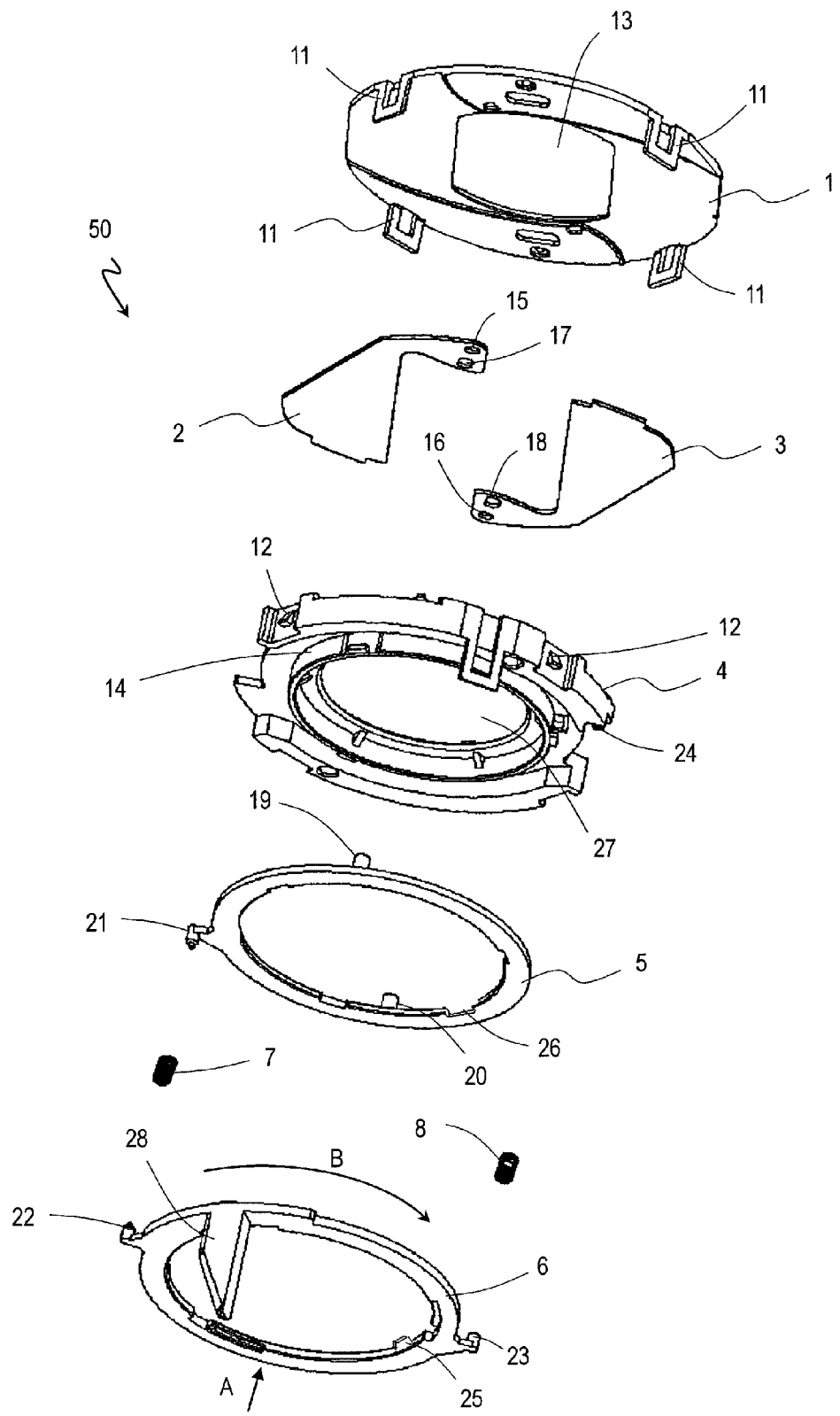
FIG. 7 is an exploded perspective view illustrating the downside of those members of the conventional barrier unit.

FIGS. 4 and 5 are schematic representations illustrating what forces are applied to the opened blades in the barrier unit 50. FIGS. 4 and 5 also illustrate where the respective members are arranged, as viewed in the direction indicated by the arrow A in FIGS. 1 and 2, when the blades are opened.

In FIG. 4, the second ring 6 indicated by the dashed circle is biased by the second spring 8 shown at the bottom of the FIG. 4 to the opening direction C, thereby driving the first ring 5 indicated by the solid circle in the direction C via the ring projection 25a and the notched portion 26a shown at the top of FIG. 4. The cam pin 19 presses the elongate hole 17 and biases the first blade 2 to the opening direction C. As a result, the first blade 2 is brought into contact with, and pressed against, the stopper 29 and stops turning there.

At this point in time, forces P1 and P3 are applied to the first ring 5 from the first spring 7 and from the ring projection 25a on the second ring 6, respectively. On the other hand, the reaction force of the force P1 is applied from the first spring 7 to the spring hook 22 of the second ring 6, force P2 is also applied from the second spring 8 to the second ring 6, and the reaction force of the force P3 is applied from the first ring 5 to the second ring 6. Consequently, the biasing force P3 applied from the second ring 6 to the first ring 5 via the ring projection 25a becomes the resultant force produced by the reaction force of the force P1 applied from the first spring 7 and the force P2 applied from the second spring 8.

Suppose the distance from the point of contact 34 between the cam pin 19 and the elongate hole 17 to the point of application of the force P1 as measured perpendicularly to the direction in which the force P1 is applied is identified by L1 and the distance from the cam pin 19 to the point of application of the force P3 as measured perpendicularly to the direction in which the force P3 is applied is identified by L2.

In that case, the moments of two forces are applied to the first ring 5 with respect to the point of contact 34. More specifically, the moment $$P1 \times L1$$

is applied in the direction B to the first ring 5. In addition, the moment $$P3 \times L2$$

is further applied in the direction C to the first ring 5.

In this case, since the notched portion 26a of the first ring 5 and the ring projection 25a on the second ring 6 are arranged near the spring hook 21, $$L1 \approx L2$$

is satisfied. Also, $$P1 \times L1 < (P1+P2) \times L2$$

$$(\text{i.e., } P1 \times L1 < P3 \times L2)$$

is met. Therefore, as the resultant moment $$P3 \times L2 - P1 \times L1$$

is applied thereto, the first ring 5 can rotatably move a distance corresponding to the magnitude of the clearance 31 in the direction D with respect to the point of contact 34. As a result, the cam pin 20 on the first ring 5 biases the elongate hole 18 of the second blade 3 to the direction in which the second blade 3 opens. Due to this biasing force, the second blade 3 contacts with the stopper 30 and stops at the fully opened position without producing any backlash.

In the example illustrated in FIG. 4, the first blade 2 is supposed to be biased toward the stopper 29 earlier than the second blade 3. According to the precision of the parts, however, the second blade 3 may be biased toward its stopper 30 earlier than the first blade 2. Hereinafter, it will be described with reference to FIG. 5 what forces are applied to the blade in such a situation.

In FIG. 5, the second ring 6 indicated by the dashed circle is biased by the second spring 8 shown at the bottom of the FIG. 5 to the opening direction C, thereby driving the first ring 5 indicated by the solid circle in the direction C via the ring projection 25a and the notched portion 26a shown at the top of FIG. 5. The cam pin 20 presses the elongate hole 18 and biases the second blade 3 to the opening direction C. As a result, the second blade 3 is brought into contact with, and pressed against, the stopper 30 and stops turning there.

At this point in time, forces P1 and P3 are applied to the first ring 5 from the first spring 7 and from the ring projection 25a on the second ring 6, respectively. On the other hand, the reaction force of the force P1 is applied from the first spring 7 to the second ring 6, force P2 is also applied from the second spring 8 to the second ring 6, and the reaction force of the force P3 is applied from the first ring 5 to the second ring 6. Consequently, the biasing force P2 applied from the second ring 6 to the first ring 5 via the ring projection 25a becomes the resultant force produced by the reaction force of the force P1 applied from the first spring 7 and the force P2 applied from the second spring 8.

Suppose the distance from the point of contact 35 between the cam pin 20 and the elongate hole 18 to the point of application of the force P1 as measured perpendicularly to the direction in which the force P1 is applied is identified by L3 and the distance from the contact 34 to the point of application of the force P3 as measured perpendicularly to the direction in which the force P3 is applied is identified by L4.

In that case, the moments of two forces are applied to the first ring 5 with respect to the point of contact 35. More specifically, the moment $$P1 \times L3$$

is applied in the direction B to the first ring 5. In addition, the moment $$P3 \times L4$$

is further applied in the direction C to the first ring 5.

In this case, since the notched portion 26a of the first ring 5 and the ring projection 25a on the second ring 6 are arranged near the spring hook 21, $$L3 \approx L4$$

is satisfied. Also, $$P1 \times L3 < P3 \times L4$$

is met. Therefore, as the resultant moment $$P3 \times L4 - P1 \times L3$$

is applied thereto, the first ring 5 can rotatably move a distance corresponding to the magnitude of the clearance 31 in the direction E with respect to the point of contact 35. As a result, the cam pin 19 on the first ring 5 biases the elongate hole 17 of the first blade 2 to the direction in which the first blade 2 opens. Due to this biasing force, the first blade 2 contacts with the stopper 29 and stops at the fully opened position without producing any backlash.

According to this preferred embodiment, a significantly greater backlash is allowed between the inner periphery of the first ring 5 and the cylindrical portion 14 of the base 4 than in a conventional arrangement. For example, although the backlash needs to be reduced to the range of 0.02 mm to 0.05 mm in the conventional arrangement, the backlash has only to fall within the range of 0.2 mm to 0.3 mm according to the present invention.

That is to say, compared to the conventional arrangement, the precision can be loosened by one order of magnitude according to the present invention. That is why the respective parts may be assembled together with much less precision, and therefore, the precision test can be carried out much more easily. As a result, the yield can be increased significantly.

On top of that, if the backlash should be regulated as strictly as in the conventional arrangement, the barrier unit would get easily out of order with intrusion of some foreign matter. On the other hand, if a greater backlash is allowed as in the present invention, the barrier unit will not get out of order so easily as in the prior art even with intrusion of some foreign matter.

Also, while the blades are opening or closing, the first and second rings 5 and 6 are supposed to rotate together around the cylindrical portion 14 of the base both in the conventional arrangement and in the present invention with the ring projection 25 and the notched portion 26 (which function as ring-to-ring interlocking portions) engaged with each other. In the conventional arrangement, however, the ring-to-ring interlocking portions are not located in the vicinity of the first spring 7, and therefore, the tension of the first spring 7 with respect to the ring-to-ring interlocking portions will produce a moment that makes the first and second rings clamp the cylindrical portion of the base. As a result, sliding load will be produced between the cylindrical portion of the base and the first and second rings, thus interfering with smooth opening or closing of the blades.

On the other hand, since the ring projection 25a and the notched portion 26a that function as the ring-to-ring interlocking portions are arranged in the vicinity of the first spring 7 according to the present invention, the tension of the first spring 7 with respect to the ring-to-ring interlocking portions will hardly produce such a moment that makes the first and second rings clamp the cylindrical portion 14 of the base 4. As a result, no sliding load will be produced between the cylindrical portion 14 of the base 4 and the first and second rings, and therefore, the blades can open or close smoothly.

In the preferred embodiment described above, the barrier unit is supposed to use the first and second springs 7 and 8. However, this is just an example. Optionally, rubber or any other suitable elastic member may also be used.

INDUSTRIAL APPLICABILITY

The present invention can be used in a barrier unit to protect the lens of a still camera or a video movie camera.

The invention claimed is:

1. A barrier unit, which is designed to be attached to a camera in order to protect the lens of the camera and which is ready to open or close as needed, the barrier unit comprising:
   a base with a cylindrical portion;
   a first ring, which is arranged so as to rotate around the cylindrical portion;
   first and second blades, which are interlocked with the first ring and which are gradually opened and closed as the first ring rotates, and
   a second ring, which is arranged so as to rotate around the cylindrical portion,
   wherein when one of the first and second blades is fully opened, the first ring is further movable to turn the other blade in an opening direction,
   wherein a first elastic member is arranged between the first and second rings in order to bias the first ring to a direction in which the first and second blades are closed, and
   wherein a second elastic member is arranged between the base and the second ring in order to bias the first ring to a direction in which the first and second blades are opened.

2. The barrier unit of claim 1,
   wherein a ring-to-ring interlocking portion is further arranged between the first and second rings, and
   wherein the interlocking portion is located near the elastic member on the first ring.

3. The barrier unit of claim 2, wherein when one of the first and second blades is fully opened, the first ring further moves to open the other blade fully.

4. A barrier unit, which is designed to be attached to a camera in order to protect the lens of the camera and which is ready to open or close as needed, the barrier unit comprising:
   a base with a cylindrical portion;
   first and second blades, which are arranged so as to turn with respect to the base; and
   first and second rings, which are arranged so as to rotate around the cylindrical portion,
   wherein the first ring has first and second fitting portions to fit into, and drive, the first and second blades, respectively, and
   wherein an opening direction is the direction of rotation of the first ring that causes the first and second blades to open via the first and second fitting portions and a closing direction is the opposite direction of the rotation of the first ring that causes the first and second blades to close via the first and second fitting portions,
   a first elastic member is extended between the first and second rings so as to bias the first ring to the closing direction;
   a ring-to-ring interlocking portion is arranged between the first and second rings; and a second elastic member is extended between the base and the second ring so as to bias the first ring to the opening direction via the ring-to-ring interlocking portion, and wherein as the second ring is rotatably driven, the first ring rotates in the closing direction via the ring-to-ring interlocking portion, thereby closing the first and second blades, and wherein unless the second ring is driven, the first and second blades are kept opened by the second elastic member, and wherein clearance is left between the first ring and the cylindrical portion of the base perpendicularly to the direction of rotation of the first ring, and wherein the ring-to-ring interlocking portion is arranged at only one position near the first elastic member on the first ring.

5. The barrier unit of claim 4, wherein the first and second fitting portions are arranged at two opposite positions so that an angle of approximately 180 degrees is formed between the first and second fitting portions with respect to the center of rotation of the first and second rings on the base, and wherein the ring-to-ring interlocking portion is arranged in the vicinity of a midpoint between the first and second fitting portions on the first ring.

6. The barrier unit of claim 5, wherein the second elastic member is arranged at a position on the second ring so as to face the ring-to-ring interlocking portion at the other end and to define an angle of approximately 180 degrees between the second elastic member and the ring-to-ring interlocking portion.

7. A camera comprising the barrier unit of claim 1.

8. A camera comprising the barrier unit of claim 4.

* * * * *